United States Patent [19]

Dawson et al.

[11] Patent Number: 5,447,199
[45] Date of Patent: Sep. 5, 1995

[54] CONTROLLED DEGRADATION OF POLYMER BASED AQUEOUS GELS

[75] Inventors: Jeffrey C. Dawson, Spring; Hoang V. Le, Houston, both of Tex.

[73] Assignee: BJ Services Company, Houston, Tex.

[21] Appl. No.: 86,783

[22] Filed: Jul. 2, 1993

[51] Int. Cl.⁶ .............................................. E21B 43/26
[52] U.S. Cl. ................................. 166/300; 166/308; 507/921; 507/922
[58] Field of Search .................... 166/300, 308; 252/8.551; 507/921, 922

[56] References Cited

U.S. PATENT DOCUMENTS

| | | | |
|---|---|---|---|
| 3,922,173 | 11/1975 | Misak | 106/194 |
| 4,144,179 | 3/1979 | Chatterji | 252/8.551 |
| 4,199,484 | 4/1980 | Murphey | |
| 4,259,205 | 3/1981 | Murphey | 252/326 |
| 4,324,668 | 4/1982 | Harris | 252/8.551 X |
| 4,368,136 | 1/1983 | Murphey | 252/319 X |
| 4,488,975 | 12/1984 | Almond | 166/308 X |

*Primary Examiner*—George A. Suchfield
*Attorney, Agent, or Firm*—Charles D. Gunter, Jr.; Susan L. Firestone

[57] ABSTRACT

A method of fracturing a subterranean formation in a well bore is shown in which a gellable fracturing fluid is first formed by blending together an aqueous fluid, a hydratable polymer, a suitable crosslinking agent for crosslinking the hydratable polymer to form a polymer gel and a breaker comprising a slightly water soluble, organic peroxide. The crosslinked polymer gel is pumped into the well bore under sufficient pressure to fracture the surrounding formation. The breaker is allowed to degrade the crosslinked polymer with time to reduce the viscosity of the fluid so that the fluid can be pumped from the formation back to the well surface.

11 Claims, No Drawings

CONTROLLED DEGRADATION OF POLYMER BASED AQUEOUS GELS

BACKGROUND OF THE INVENTION

1. Field of the Invention

The present invention relates to fracturing fluids of the type used in well bore operations and particularly to a method for producing a gradual reduction in the viscosity of a fracturing fluid through the use of slightly water soluble, organic peroxides incorporated in the viscous fluid.

2. Description of the Prior Art

During hydraulic fracturing, a sand laden fluid is injected into a well bore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. The fracturing fluid can be accompanied by a propping agent which results in placement of the propping agent within the fracture thus produced. The proppant remains in the produced fracture to prevent the complete closure of the fracture and to form a conductive channel extending from the well bore into the formation being treated once the fracturing fluid is recovered.

Fluid viscosity relates to the gel's ability to place proppant, influence fracture geometry and enhance fluid loss characteristics. The fracturing fluid's viscosity is normally obtained by using suitable polymers, such as polysaccharides. To further enhance the viscosity, a crosslinking agent is frequently added to the fracturing fluid to gel the polysaccharide.

The recovery of the fracturing fluid is accomplished by reducing the viscosity of the fluid to a low value such that it flows from the formation under the influence of formation fluids and pressure while retaining the proppant within the fracture. This viscosity reduction or conversion is referred to as "breaking" and can be accomplished by incorporating chemical agents, referred to as breakers, into the initial gel.

In addition to the importance of providing a breaking mechanism for the gelled fluid to facilitate recovery of the fluid, the timing of the break is also of great importance. Gels that break prematurely can cause suspended proppant material to settle out of the gel before being introduced a sufficient distance into the produced fracture. Premature breaking can also result in a premature reduction in the fluid viscosity resulting in a less than desirable fracture length in the fracture being created.

On the other hand, gelled fluids that break too slowly can cause slow recovery of the fracturing fluid from the produced fracture with attendant delay in resuming the production of formation fluids. Additional problems can result, such as the tendency of proppant to become dislodged from the fracture, resulting in at least partial closing and decreased efficiency of the fracturing operation.

For purposes of the present application, premature breaking will be understood to mean that the gel viscosity becomes diminished to an undesirable extent before all of the fluid is introduced into the formation to be fractured.

Optimally, the fracturing gel will begin to break when the pumping operations are concluded. For practical purposes, the gel should be completely broken within a specific period of time after completion of the fracturing period. At higher temperatures, for example, about 24 hours is sufficient. A completely broken gel naturally flushes from the formation by the flowing formation fluids or can be recovered by a swabbing operation. In the laboratory setting, a completely broken, non-crosslinked gel is one whose viscosity is either about 10 centipoises or less as measured on a Model 50 Fann viscometer R1/B1 at 300 rpm or less than 100 centipoises by Brookfield viscometer spindle #1 at 0.3 rpm.

By way of comparison, certain gels, such as those based upon guar polymers, undergo a natural break without the intervention of chemical additives. The break time can be excessively long, however. Accordingly, to decrease the break time of gels used in fracturing, chemical agents are incorporated into the gel and become a part of the gel itself. These chemical agents include, for example, oxidants such as persulfate salts.

However, obtaining delayed breaks using oxidants, such as persulfate salts, to degrade polysaccharide viscosifiers has proved difficult. The rate of degradation usually depends on the temperature and the persulfate concentration. At temperatures above about 140° F., the rate of degradation is difficult to control, often causing a significant loss of viscosity before completing proppant placement. The fracturing fluid loses a sizeable fraction of the persulfate when water from the fluid permeates away from the fracture through the porous rock of the formation matrix. The larger polysaccharide simultaneously filters out and adsorbs onto the fracture face, forming a tough, leathery filter cake. Consequently, the relative concentration of polysaccharide steadily increases in the fracture during injection. This filtration effect leaves inadequate amounts of persulfate to degrade both the gel and filter cake. To combat the loss of persulfate to the formation, large amounts of persulfate are used. Large amounts of persulfates, however, can prematurely reduce the fluid viscosity during injection to cause a premature breaking of the gel.

In response to the problems with using oxidants, a recent advancement encapsulates persulfate to segregate it from the fracturing fluid. The persulfate either permeates through the capsule wall or is released by crushing from the proppant during fracture closure, thus delaying gel breaking. Both releases ensure that adequate persulfate is available for complete polysaccharide degradation.

The encapsulated persulfate has some disadvantages. The effectiveness diminishes with increasing temperature. At temperatures exceeding 200° F., most of the persulfate is consumed within the capsule before being released. A pressure differential may form across the coating and force water into the capsule. At high temperature, water reacts with the persulfate within the capsule, thus decreasing the amount of persulfate available. Also, persulfate particles are angular and the capsule thickness can vary across the surface of the particle. This non-uniform thickness causes some thin skinned particles to release too early, causing premature viscosity loss.

The present invention has as its object to provide a break mechanism for a gelled fracturing fluid which yields high initial viscosity with little change during pumping but which produces a rapid break in the gel after pumping is completed to allow immediate recovery of the fluid from the formation.

Another object of the invention is to provide a gel system for a well fracturing operation which can break the gel polymers at moderate to high temperatures without interfering with the crosslinking chemistry and causing premature breaking.

SUMMARY OF THE INVENTION

In the method of the invention, a gellable fracturing fluid is formulated by blending together an aqueous fluid, a hydratable polymer, which is capable of forming a polymer gel and a breaker comprising a slightly water soluble, organic peroxide. The breaker is effective to degrade the polymer gel at temperatures between about 125° F. to 275° F. and at a pH range of about 3 to about 11.

Preferably, the gellable fracturing fluid is formulated by blending together an aqueous fluid, a hydratable polymer, a crosslinking agent for crosslinking the hydratable polymer and the slightly water soluble, organic peroxide breaker. The fluid is then pumped to a desired location within the well bore under sufficient pressure to fracture the surrounding subterranean formation. Thereafter, the breaker degrades the polymer, whereby the fluid can be pumped from the subterranean formation to the well surface.

In another preferred method for practicing the invention, the gellable fracturing fluid is formulated by blending together an aqueous fluid, a hydratable polymer, a suitable crosslinking agent for crosslinking the hydratable polymer to form a polymer gel and a slightly water soluble, organic peroxide in a water immiscible, nonoxidizable, organic solvent. The cross-linked fluid is pumped to a desired location in the well bore to fracture the formation. The breaker then reduces the viscosity of the fluid, whereby the fluid can be pumped from the subterranean formation back to the well surface.

Additional objects, features and advantages will be apparent in the written description that follows.

DETAILED DESCRIPTION OF THE INVENTION

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time which is sufficient to form a hydrated solution. The hydratable polymer useful in the present invention can be any of the hydratable polysaccharides that are familiar to those in the well service industry. These polysaccharides are capable of gelling in the presence of a crosslinking agent to form a gelled based fluid. For instance, suitable hydratable polysaccharides are the galactomannan gums, guars, derivatized guars, cellulose and cellulose derivatives. Specific examples are guar gum, guar gum derivative, locust bean gum, caraya gum, xanthan gum, cellulose, and cellulose derivatives. The preferred gelling agents are guar gum, hydroxypropyl guar, carboxymethyl hydroxypropyl guar, cellulose, carboxymethyl cellulose, carboxymethyl hydroxyethyl cellulose and hydroxyethyl cellulose. The most preferred gelling agents are guar gum, hydroxypropyl guar, carboxymethyl hydroxypropyl guar, hydroxyethyl cellulose and carboxymethyl hydroxyethyl cellulose.

The method of the invention reduces the viscosity of other polysaccharides used in the oil industry as well. These polysaccharides are not crosslinked. Polysaccharides, such as starch, thicken fluids or control fluid loss. Starch or derivatized starch, whether water soluble or insoluble, can be used. Xanthan gums are often used as sand control agents. Therefore, whenever the terms "breaker" and "breaking" are used generically in this disclosure and claims, the terms also encompass the method of reducing the viscosity of fluids with viscous, noncrosslinked, polysaccharides such as starches, xanthans, and the like.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 18 pounds per gallon of fracturing fluid composition, but higher or lower concentrations can be used as required. The base fluid can also contain other conventional additives common to the well service industry such as surfactants, and the like.

In this invention, the breaker is an organic peroxide that is slightly soluble in water. In this disclosure, the term "organic peroxide" refers to organic peroxides and organic hydroperoxides, while "slightly water soluble" refers to the solubility of an organic peroxide in water of about 1 g/100 g or less at room temperature and pressure. Preferably, the solubility is about 0.10 g or less of organic peroxide per 100 g of water. The solubility can be measured by using an iodometric titration such as that described by Arthur Vogel in *Vogel's Textbook of Quantitative Chemical Analysis*, 5th ed., § 10.110, 384–87, Longman Scientific & Technical 1989.

The organic peroxides of the invention should also have large activation energies for peroxy radical formation and relatively high storage temperatures that usually exceed 80° F. High activation energies and storage temperatures of the organic peroxides of the invention lend stability which provides a practical shelf life. Preferred organic peroxides are cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide and mixtures thereof. Cumene hydroperoxide, for example, has a slight water solubility of about 0.07 g/100 g water, an activation energy of 121 kJ/mole in toluene and a half life of 10 hours at 318° F.

The following model is intended to aid in understanding the method without limiting the invention's scope. After adding the peroxide, a small concentration of peroxide dissolves in the aqueous phase before reaching saturation. Once saturated, the solubility of the peroxide establishes an equilibrium. This equilibrium favors the dispersal of undissolved peroxide in the aqueous phase as immiscible droplets. During pumping, the fracturing fluid heats to temperatures near the reservoir temperature. At these higher temperatures, the peroxide in the water phase undergoes homolytic cleavage of the peroxide bond to form two free radical fragments. These free radical fragments ultimately collide with the polymer, remove a hydrogen atom and initiate the further decomposition of the polymer. As the peroxide is consumed, more peroxide from the dispersed droplets dissolves in the water phase to re-establish the equilibrium.

This release mechanism allows higher concentrations of peroxide to be used, thus assuring complete degradation of both the gel and filter cake. More importantly, the water immiscible droplets of peroxide should become trapped in the polymer filter cake. This assures that the peroxide concentration in the filter cake increases at nearly the same rate as the polymer.

Slightly water soluble, organic peroxides should have better retention in the fracture during injection than water soluble organic peroxides, such as t-butyl hydroperoxide described by Misak in U.S. Pat. No. 3,922,173, and available as a 70% (by weight) aqueous solution. The retainment is due to the polysaccharide filter cake. The cake, when exposed to a pressure differential during pumping, allows the water phase to filter through the cake thickness. After passing through the filter cake, the water and any associated water soluble solutes enter into the formation matrix. Consequently, water soluble peroxides behave similarly to persulfates with a sizeable fraction degrading in the formation matrix.

In contrast, most of the slightly water soluble, organic peroxides are not in the water phase and do not filter through the polysaccharide filter cake into the formation. Most of the organic peroxides of the invention become trapped within the cake matrix. Therefore, the organic peroxide concentration should increase within the fracture at nearly the same rate as the polysaccharide and retaining sufficient amounts to degrade both fluid and filter cake.

The rate of the slightly water soluble, organic peroxide degradation depends on temperature and organic peroxide concentration. The amount of slightly water soluble, organic peroxide used is an amount sufficient to decrease viscosity or break a gel without a premature reduction of viscosity. For example, if the average gelled polysaccharide polymer has a molecular weight of about two million, and the desired molecular weight reduction is about 200,000 or less, then the reduction would entail about ten cuts. A concentration of 20 ppm of organic peroxide should degrade the polysaccharide without a premature reduction of viscosity. Preferably, the amount of organic peroxide ranges from about 5 to about 10,500 ppm based on the fracturing fluid. Usually though, the concentration depends on both polysaccharide content, preferably about 0.24% to about 0.72% (weight/volume) and the temperature. The applicable temperatures range from about 125° F. to about 275° F. The applicable pH ranges from about 3 to about 11.

A further delay in breaking can be achieved by diluting the slightly water soluble, organic peroxide in a water immiscible or insoluble, nonoxidizable, organic solvent. This approach most likely slows the release rate of the water immiscible droplets dispersed in the aqueous phase. The peroxide is soluble in these solvents and therefore, partitions to a much greater extent in the organic phase. Thus, the rate of release into the water phase is significantly suppressed. The water immiscibility of the dispersed organic peroxide droplets, together with its high activation energies, causes long induction times resulting in initial fluid stability.

The water immiscible nonoxidizable, organic solvent should be relatively pure, preferably at least a technical grade, or have nonoxidizable, nonpolar impurities. Preferably the solvent is a refined oil having carbon constituents of five carbons of greater, more preferably, hydrocarbon constituents. These refined oils are refined straight chain, branched or cyclic alkanes, aromatic compounds, paraffinic or isoparaffinic oils, and mixtures thereof. In this disclosure, "paraffinic oils" and "isoparaffinic oils" refer to refined paraffinic and isoparaffinic materials. Most preferred solvents are straight chain or branched chain, saturated alkane oils, such as hexane, and paraffinic or isoparaffinic oils, such as "NORPAR", "ISOPAR" and "ESCAID" refined oils, available from EXXON and white mineral oil, such as "21 USP". White Mineral Oil, available from AMOCO. Diesel oil is ineffective due to its high oxidizable impurity content. Dilutions of the organic peroxides in up to 95% water immiscible solvents are effective, especially for temperatures exceeding 200° F. Preferred dilutions of organic peroxide range from 100% (neat) to about 10% organic peroxide in water immiscible solvent.

The fracturing fluids of the invention often include a crosslinking agent. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium, for example, zirconium chelates such as zirconium acetate, zirconium lactate, zirconium lactate triethanolamine and titanium containing compounds including the so-called organotitinates, for example, the titanium chelates such as triethanolamine titanates, titanium acetylacetonate and titanium lactate. See, for instance, U.S. Pat. No. 4,514,309.

In the case of borate crosslinkers, the crosslinking agent is any material which supplies borate ions in solution. Thus the crosslinking agent can be any convenient source of borate ions, for instance the alkali metal and the alkaline earth metal borates and boric acid. One such crosslinking additive is sodium borate decahydrate, the crosslinking agent described in Dawson's U.S. Pat. No. 5,160,643. In a guar gel, this crosslinking additive is preferably present in the range from about 0.024% to in excess of 0.18% by weight of the aqueous fluid. Preferably, the concentration of crosslinking agent is in the range from about 0.024% to about 0.09% by weight of the aqueous fluid.

The crosslinking additive may also effect the required organic peroxide concentration. Some components in the crosslinking additives, for example glyoxal, are easily oxidizable. Other components, for instance triethanolamine, are initiation catalysts, although low temperature activation catalysts have less of an effect on the slightly water soluble, organic peroxides of the invention. Therefore, the concentration of the organic peroxide should be adjusted for these effects.

In a typical fracturing operation, the fracturing fluid of the invention is pumped at a rate sufficient to initiate and propagate a fracture in the formation and to place propping agents into the fracture. A typical fracturing treatment would be conducted by hydrating a 0.24% to 0.72% (weight/volume [w/v]) polysaccharide based polymer, such as guar, in a 2% (w/v) KCl solution. During the actual pumping, as described, the pH is adjusted by the addition of a buffer, followed by the addition of the breaker, crosslinking agent, proppant and other additives if required.

Although several methods of the invention are described above, no best mode of the invention currently exists. The following examples illustrate that the breaker is effective and remains effective using different crosslinkers and different breakers.

EXAMPLE 1

A solution of 4.8 g of high viscosity guar gum in 1 l of 2% (wt) potassium chloride was hydrated for about 30 minutes, then treated with 5 ml of 45% (wt) aq. potassium carbonate solution and 4 ml of 25% (wt) cumene hydroperoxide in 2 l USP white mineral oil (AMOCO). The solution was treated with 1.25 ml of 23% (wt) aq. borax solution while vigorously sheared in a Waring blender, thus causing rapid gellation. The gel was vigorously sheared for an additional 60 sec. The resulting gel pH was 10.89. Then, 72 ml of gel were syringed into a Fann 50C sample cup.

The "FANN 50C" is a rotational viscometer utilizing a couette geometry. The bob, B1, has a radius of 1.724 cm and length of 7.62 cm. The rotor (R1) has a radius of 1.842 cm. The sample cup was placed on the rheometer and pressurized to 150 psi with nitrogen. The sample was continuously rotated at 60 RPM or 102 sec$^{-1}$ while heating to 203° F. At test temperature, a rate sweep using 170, 128, 85 and 42 sec$^{-1}$, for 30 sec each, was made and repeated every 30 min. Between sweeps, the interim rate was 102 sec$^{-1}$. The stress and rates from the rate sweeps were used to calculate the Power Law indices n' and K' as described in the American Petroleum Institutes manual RP-39 (Standard Procedure for the Evaluation of Hydraulic Fracturing Fluids). The Power Law indices were then use to calculate apparent viscosities at 170 sec$^{-1}$. The data are presented in Table 1.

TABLE 1

| Time (min) | Temp (°F.) | Visc (cp@170s$^{-1}$) | Visc (cp@40s$^{-1}$) |
|---|---|---|---|
| 17 | 197 | 427 | 1078 |
| 47 | 199 | 506 | 1140 |
| 77 | 200 | 495 | 996 |
| 107 | 202 | 470 | 875 |
| 137 | 203 | 459 | 842 |
| 167 | 203 | 436 | 873 |
| 197 | 203 | 416 | 774 |
| 227 | 202 | 396 | 700 |
| 257 | 202 | 359 | 580 |
| 287 | 203 | 320 | 450 |
| 317 | 203 | 295 | 346 |
| 346 | 202 | 252 | 202 |
| 376 | 203 | 164 | 98 |
| 406 | 204 | 39 | 45 |
| 436 | 205 | 16 | 30 |
| 466 | 204 | 11 | 22 |
| 496 | 204 | 10 | 8 |

EXAMPLE 2

A solution of 4.8 g of carboxymethyl hydroxypropyl guar (a guar gum derivative) in 1 l of 2% (wt) potassium chloride was hydrated for 30 minutes in a Waring blender, then treated with 1 ml of 34% (wt) potassium carbonate solution and 8 ml of 25% (wt) cumene hydroperoxide in "NORPAR" 12 refined oil (EXXON). With vigorous stirring, 1.25 ml of a 6% (wt) zirconium lactate solution was added, followed by an additional 60 sec stirring. The resulting gel pH was 8.91. Then 72 ml of gel was syringed into the Fann 50 cup. The viscometer test described in Example 1 was repeated and the data presented in Table 2.

TABLE 2

| Time (min) | Temp (°F.) | Visc (cp@170s$^{-1}$) | Visc (cp@40s$^{-1}$) |
|---|---|---|---|
| 17 | 165 | 301 | 650 |
| 77 | 162 | 376 | 641 |
| 137 | 161 | 337 | 530 |
| 197 | 162 | 384 | 687 |
| 227 | 162 | 350 | 630 |
| 257 | 160 | 301 | 554 |
| 287 | 162 | 250 | 460 |
| 317 | 159 | 206 | 369 |
| 347 | 162 | 159 | 272 |
| 377 | 163 | 114 | 196 |
| 407 | 162 | 79 | 134 |
| 437 | 163 | 59 | 104 |
| 467 | 163 | 44 | 69 |
| 497 | 163 | 33 | 54 |
| 527 | 163 | 25 | 31 |
| 557 | 163 | 19 | 24 |
| 587 | 163 | 14 | 17 |

EXAMPLE 3

The test in Example 1 was repeated, except the solution was treated with 3.7 ml of neat cumene hydroperoxide (CHP) and the test temperature was 180° F. To demonstrate the effective retardation caused by the addition of a water immiscible, nonoxidizable, organic solvent, the test was repeated initially with 7.4 ml of 50% (wt) cumene hydroperoxide in "NORPAR" 12 refined oil. Lastly, the test was again repeated with 14.8 ml of 25% (wt) cumene hydroperoxide. In each case, the amount of organic peroxide was identical with the results shown in Table 3.

TABLE 3

| | Viscosity (cp@170 sec$^{-1}$) | | |
|---|---|---|---|
| Time (min) | CHP (neat) | 50% CHP | 25% CHP |
| 21 | 395 | 518 | 376 |
| 50 | 173 | 475 | 369 |
| 80 | 23 | 432 | 361 |
| 110 | 7 | 365 | 353 |
| 140 | 5 | 284 | 286 |
| 170 | 5 | 200 | 317 |
| 200 | 4 | 82 | 243 |
| 230 | 4 | 21 | 144 |
| 260 | 4 | 16 | 50 |
| 290 | 4 | 6 | 14 |

EXAMPLE 4

Example 2 was repeated using 6.0 g carboxymethyl hydroxypropyl guar and 2 ml of 45% (wt) potassium carbonate. 0.5 ml of t-butylcumyl peroxide was used to slowly degrade the gel at 255° F. using the experimental procedure described in Example 1 and the resulting data presented in Table 4.

TABLE 4

| Time (min) | Temp °F. | Visc (cp@170s$^{-1}$) | Visc (cp@40s$^{-1}$) |
|---|---|---|---|
| 17 | 263 | 305 | 774 |
| 46 | 255 | 239 | 554 |
| 76 | 254 | 161 | 359 |
| 106 | 254 | 118 | 241 |
| 136 | 254 | 212 | 304 |
| 166 | 254 | 227 | 262 |
| 196 | 254 | 127 | 186 |
| 226 | 255 | 68 | 115 |
| 256 | 255 | 44 | 87 |
| 286 | 255 | 35 | 69 |
| 316 | 255 | 28 | 64 |
| 345 | 255 | 24 | 60 |
| 375 | 255 | 23 | 53 |
| 405 | 256 | 21 | 51 |
| 435 | 256 | 20 | 46 |
| 465 | 256 | 19 | 43 |
| 525 | 256 | 16 | 35 |

TABLE 4-continued

| Time (min) | Temp °F. | Visc (cp@170s$^{-1}$) | Visc (cp@40s$^{-1}$) |
|---|---|---|---|
| 585 | 256 | 13 | 28 |

EXAMPLE 5

A polymer solution composed of 6.0 g of carboxymethyl hydroxypropyl guar in 1 l of 2% potassium chloride was treated with 1.2 g of sodium thiosulfate, about 1 ml of glacial acetic acid, 3 ml of t-butylcumyl peroxide and 1 ml of a zirconium lactate triethanolamine crosslinker. The pH of the resulting gel was 4.80. Then, 72 ml of gel was syringed into the Fann 50 cup and the test method described in Example 1 was used to evaluate the gel degradation at 200° F. The gel degradation data is shown in Table 5.

TABLE 5

| Time (min.) | Temperature (°F.) | Viscosity (cp@170s$^{-1}$) |
|---|---|---|
| 17 | 198 | 339 |
| 77 | 200 | 505 |
| 137 | 200 | 406 |
| 197 | 200 | 335 |
| 257 | 201 | 283 |
| 317 | 201 | 283 |
| 377 | 203 | 194 |
| 437 | 202 | 173 |
| 497 | 201 | 148 |
| 557 | 200 | 107 |
| 617 | 201 | 62 |
| 677 | 200 | 11 |

The results show that slightly water soluble, organic peroxides delay the reduction of viscosity or gel breaking at moderate to high temperatures and at alkaline or acidic pH. For instance, Table 2 illustrates that good viscosity is maintained for the first 287 minutes, followed by rapid viscosity declines, thus indicating successful degradation. Table 3 shows that although the amount of organic peroxide used is identical, the addition of a water immiscible, nonoxidizable, organic solvent effectively delays gel breaking.

The invention has several advantages. The breaker system remains active at both alkaline and acid pH levels. The higher pH levels strengthen the crosslinks in the gel, allowing for better fracturing and contribute to better proppant transport. Yet, the breaker system also works at acid pHs. The breaker system is active at moderate to high temperatures commonly found in subterranean formations. In addition, the fracturing fluid and method allow a delayed reduction in viscosity of the fracturing fluid so that the gelled fluid "breaks" at the conclusion of the pumping operations.

While the invention has been shown in several of its forms, it is not thus limited but is susceptible to various changes and modifications without departing from the spirit thereof.

What is claimed is:

1. A method of fracturing a subterranean formation which surrounds a well bore comprising the steps of:
    formulating a viscous fracturing fluid by blending together an aqueous fluid, a hydratable polymer, and a breaker comprising a slightly water soluble, organic peroxide and a water immiscible, nonoxidizable, organic solvent;
    pumping the fracturing fluid to a desired location within the well bore under sufficient pressure to fracture the surrounding subterranean formation; and
    allowing the breaker to degrade the polymer and produce a pumpable fluid.

2. A method of fracturing a subterranean formation which surrounds a well bore comprising the steps of:
    formulating a gellable fracturing fluid by blending together an aqueous fluid, a hydratable polymer, a suitable crosslinking agent for crosslinking the hydratable polymer to form a polymer gel, and a breaker comprising a slightly water soluble, organic peroxide and a water immiscible, nonoxidizable organic solvent;
    pumping the cross-linked polymer gel to a desired location within the well bore under sufficient pressure to fracture the surrounding subterranean formation; and
    allowing the breaker to degrade the cross-linked polymer and produce a pumpable fluid.

3. The method of claim 2, wherein the slightly water soluble, organic peroxide is selected from the group consisting of:
    cumene hydroperoxide, t-butyl cumyl peroxide, di-t-butyl peroxide, di-(2-t-butylperoxyisopropyl) benzene, 2,5-dimethyl-2,5-di(t-butylperoxy) hexane, di-isopropyl benzene monohydroperoxide, dicumyl peroxide, 2,2-di-(t-butyl peroxy) butane, t-amyl hydroperoxide, benzoyl peroxide, and mixtures thereof.

4. The method of claim 2, wherein the organic peroxide is selected from the group consisting of:
    cumene hydroperoxide, t-butyl cumyl peroxide, and mixtures thereof.

5. The method of claim 2, wherein the amount of slightly water soluble, organic peroxide ranges from about 5 to about 10,500 ppm based on the fracturing fluid.

6. The method of claim 2, wherein the water immiscible, nonoxidizable, organic solvent is selected from the group consisting of:
    straight chain saturated alkanes, branched chain saturated alkanes, paraffinic oils, isoparaffinic oils, and mixtures thereof.

7. The method of claim 2, wherein the water immiscible, nonoxidizable, organic solvent is selected from the group consisting of:
    hexane, paraffinic oils, isoparaffinic oils, and mixtures thereof.

8. The method of claim 2, wherein the hydratable polymer is selected from the group consisting of:
    galactomannan gums, guars, derivatized guars, cellulose and derivatized celluloses.

9. The method of claim 2, wherein the hydratable polymer is selected from the group consisting of:
    guar gum, hydroxypropyl guar, carboxymethyl hydroxypropyl guar, cellulose, carboxymethyl cellulose, carboxymethyl hydroxyethyl cellulose and hydroxyethyl cellulose.

10. The method of claim 2, wherein the effective temperature ranges from about 125° to about 275°.

11. The method of claim 10, wherein the slightly water soluble, organic peroxide has a solubility of about 0.1 g or less of organic peroxide in 100 g of water.

* * * * *